(12) United States Patent
Collins-Rector et al.

(10) Patent No.: US 6,188,398 B1
(45) Date of Patent: Feb. 13, 2001

(54) TARGETING ADVERTISING USING WEB PAGES WITH VIDEO

(76) Inventors: Mark Collins-Rector; Chad Shakley; James Sabo; Chris Fulton, all of 2230 Broadway, Santa Monica, CA (US) 90404

(*) Notice: Under 35 U.S.C. 154(b), the term of this patent shall be extended for 0 days.

(21) Appl. No.: 09/325,004

(22) Filed: Jun. 2, 1999

(51) Int. Cl.⁷ .................................................... H04N 7/10
(52) U.S. Cl. ............................................. 345/327; 348/7
(58) Field of Search ............................... 348/8, 7, 12, 13, 348/906; 345/327, 120; 455/3.1; 380/20

(56) References Cited

U.S. PATENT DOCUMENTS

| | | | |
|---|---|---|---|
| 5,600,346 | * 2/1997 | Kamata et al. | 345/120 |
| 5,600,364 | * 2/1997 | Hendricks et al. | 348/1 |
| 5,729,279 | * 3/1998 | Fluller | 348/8 |
| 5,778,181 | * 7/1998 | Hidary et al. | 395/200.48 |
| 5,796,967 | * 8/1998 | Filepp et al. | 395/339 |
| 5,818,935 | * 10/1998 | Maa | 380/20 |
| 5,903,816 | * 5/1999 | Broadwin et al. | 455/3.1 |
| 5,907,322 | * 5/1999 | Kelly et al. | 345/327 |
| 5,929,850 | * 7/1999 | Broadwin et al. | 345/327 |

FOREIGN PATENT DOCUMENTS

WO97/11561 * 3/1997 (WO) ............................. H04N/7/173

* cited by examiner

*Primary Examiner*—Nathan Flynn
*Assistant Examiner*—Kieu-Oanh Bui

(57) ABSTRACT

A method for enabling an interactive video experience utilizing the Internet in which entertainment is combined with advertising to create an enhanced advertising experience. The invention utilizes techniques to deliver demographically targeted advertisements at predetermined times while watching a video. In addition, selectable buttons are maintained in a visible stack, which, when selected, cause a window to be opened containing further information. In this manner, a user is able to select an object, and obtain more information about the selected object, while the video stream is still playing, as well as make a purchase decision.

11 Claims, 2 Drawing Sheets

TARGETING ADVERTISING USING WEB PAGES WITH VIDEO

FIELD OF THE INVENTION

The present invention relates to methods for presenting advertising using the World Wide Web. The invention particularly relates to methods for providing targeted advertising utilizing video content having entertainment value in conjunction with the offering of products and/or services for sale.

BACKGROUND OF THE INVENTION

The Internet in general, and the World Wide Web in particular are increasingly being used by consumers for purchasing products and services as a result of web based advertising. Typically, as a consumer interfaces with a web site, what are known as banner ads are presented. If a product or service of interest appears, using well known techniques, the consumer can click on the banner ad and then be transferred to another web page or another site where more information is presented about the product or service of interest. At this point, or sometimes after clicking on additional buttons, the consumer is presented with a web page from which the product or service may be purchased.

While existing web based advertising is an interactive experience, such interactivity is largely limited as described above. In order to provide a better experience leading to a greater inducement to purchase advertised products and services, it would be preferable to provide entertainment as part of the advertising, as is the case with television, coupled with the interactive capability of the Internet. In this manner, for example, a consumer watching a video having entertainment value will be more inclined to continue to watch the video and concurrently view advertisements appearing in conjunction with the video. Further, if while watching the video, an item of interest appears, it would be desirable if a mechanism existed which enables the consumer to immediately obtain further information about the item which could be presented along with an opportunity to make a purchase decision.

SUMMARY OF THE INVENTION

A method is disclosed for enabling an interactive video experience utilizing the Internet in which entertainment is combined with advertising to create an enhanced advertising experience. The invention utilizes techniques to deliver demographically targeted advertisements at predetermined times while watching a video. In addition, selectable buttons are maintained in a visible stack, which, when selected, cause a window to be opened containing further information. In this manner, a user is able to select an object, and obtain more information about the selected object, while the video stream is still playing, as well as make a purchase decision.

DETAILED DESCRIPTION OF THE INVENTION

Figure 1:
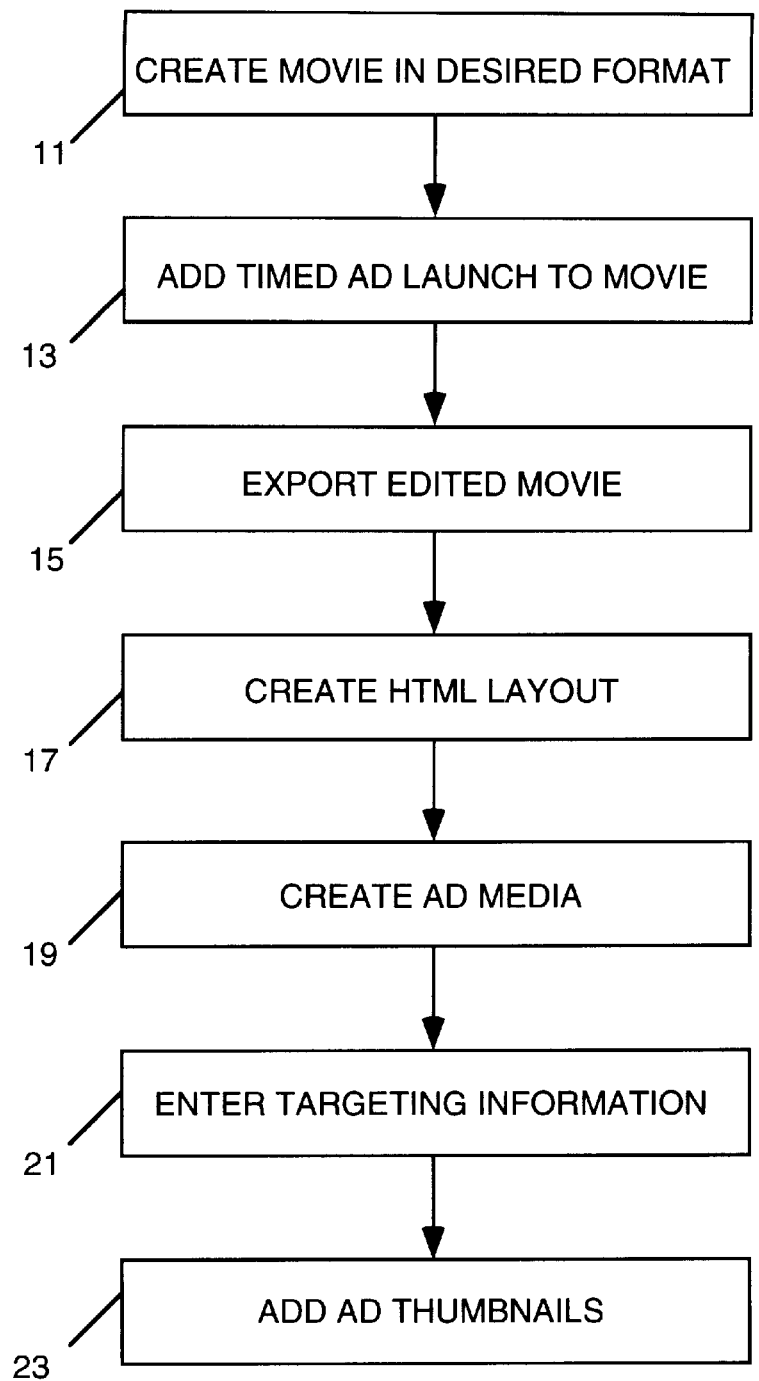
FIG. 1 is a flowchart showing the method steps for creating a video in which advertising is synchronized to the video content.

A method for providing an interactive video experience using web pages to combine entertainment and promotional activities is disclosed.

When advertising products and services, in order to maintain a potential purchaser's interest, advertisers combine the advertisement with entertaining subject matter. For example, in television, advertisements are interspersed with programming with the expectation that the viewer will sit and view an advertisement in between programming segments. Of course, attempts are also made to make the advertisements themselves entertaining independent of the programming. However, in a medium such as television, the viewer is not provided with an interactive experience in which, for example, the viewer can obtain more information about the advertised product or service, or make a purchase, by interacting with the presentation. Typically, if an item of interest is displayed, the viewer can obtain more information only by visiting a retail store or placing a telephone call to a distributor of the item being advertised using information displayed as part of the advertisement. Further, if an item of interest appears in the programming rather than in the advertisement, typically, there is no mechanism at all which would enable the viewer to obtain more information or make a purchase.

The Internet changes this model in the sense that while providing information and/or entertainment using a web site, the viewer at a location remote from the web site but connected via the Internet can usually interact with the web site by clicking on a button or the like to obtain more information about an item being displayed on the viewer's display device or initiate a purchase of an item being advertised. However, while web based advertising is interactive, typically, there is no or only a minimal relationship between the information or entertainment presented on the web page and the item or items being advertised.

The present invention is directed to a technique for combining entertainment programming with advertising of products or services which may relate to the programming to enable the viewer to interactively obtain information about products and services which may relate to the programming and proceed with making a purchase.

The present invention utilizes a number of mechanisms to enable it to combine entertainment programming and advertising in an interactive environment. First, in a video containing entertainment programming, banner ads, i.e., active areas which can be selected by a mouse click, are created which are synchronized with the video as it is playing. Such synchronism may be in conjunction with products and/or services which appear as the video is playing. That is, in addition to synchronizing based on time, such time may correspond to content displayed such that a banner ad appearing relates to the content being displayed at the time the banner ad is displayed. Unlike TV, these advertisements can be targeted using demographic information observed or volunteered by the viewer. These ads can also be updated, so that they will change as more information is available about the user or new ads are produced. Second, as a new ad banner appears, a clickable button or thumbnail for the previous ad appears. These buttons can be selected to obtain further information about an item which appeared in the banner ad represented by the button. Third, as additional new ad banners appear, additional buttons are added at the top or end of a push down stack, referred to herein as an ad toolbar, unlike traditional Internet advertising, where ads are replaced, never to be seen again.

In order to implement these mechanisms, the present invention utilizes a JavaScript and frames capable web browser and the QuickTime 3 or similar browser plugin which handles video information for display within a page and an advertisement serving system capable of doing demographic targeting. Each of these items is well known in the art and do not require further explanation. As is well known in the art, JavaScript and frames capable web browsers execute as a program in a personal computer which includes a processor, memory, a display device and an input device.

In order to implement the invention, the following steps are employed:
 I. Create a movie in a format such as QuickTime suitable for display within a web page that loads different frames, images or video, at certain times in the movie.
 II. Add a timed ad launch to the movie
 III. Export the final movie
 IV. Create an html layout for the video, ad, and ad toolbar frames
 V. Create ad media and enter targeting information into the advertising system
 VI. Add ad thumbnails A detailed description of each of these steps is set forth below with reference to FIG. 1.

I. Create a Movie in a Format Such as QuickTime that is Suitable for display Within a Web Page that Loads Different Frames, Images or Video, at Certain Times in the Movie.

In addition to QuickTime, other examples of suitable methods for delivery include Microsoft Netshow and Real Networks. The reason the capability to load different frames at certain times in the movie is needed is to enable the presentation of advertisements directly related to information presented in the video.

To create a movie in the desired format, a video is created and stored on video tape in a readily available format such as VHS or 8 mm according to well known techniques (step 11). In order to convert the video data as stored on the video tape to a format suitable for display within a web page, a commercially available product such as Premiere available from Adobe Systems Incorporated is used to digitize the video, which is then compressed and saved in the appropriate format using a video compression tool such as Movie Cleaner Pro available from Terran Interactive, Inc.

It is necessary to edit the video in order to i) add a timed ad launch to a QuickTime movie (step 13); and ii) export the final QuickTime movie (step 15).

II. Adding a Timed Ad Launch to a QuickTime Movie:

To edit the video, a tool is needed to create a streaming interactive media for integration with a web site such as Electrifier Pro available from Electrifier, Inc. To do this, a new project is opened in Electrifier Pro by clicking on "File" then "New". The dimensions of the movie should be noted from the QuickTime Movie Player application and then typed into Electrifier Pro. To do this, click on "Movie" on the toolbar then click on "Dimensions . . . " Enter the height and width of the video in pixels. Click OK. The video is dragged and dropped into Electrifier Pro and it is sized and positioned appropriately.

In Electrifier Pro click on the Preview mode tab and view the video to the desired launch point of the ad. Click pause to insert a marker on the timeline in Structure mode. Click on the Structure mode tab and find the marker on the timeline. Click on the lower half of the bar above the marker on the timeline. An "Auto-URL" window will open. Enter a descriptive name, URL to launch (which may contain an HTML file address, JavaScript function call, target within an HTML file, video, pop-up window)

III. Exporting the Final QuickTime Movie:

To export the final, edited movie (step 17), in Electrifier Pro, click on "File" on the top menu bar. Click on "Export" then "QuickTime 3". Enter a file name for the movie followed by the .mov extension. Click OK.

IV. Create an html Layout for the Video, ad, and ad Toolbar Frames

Figure 2:
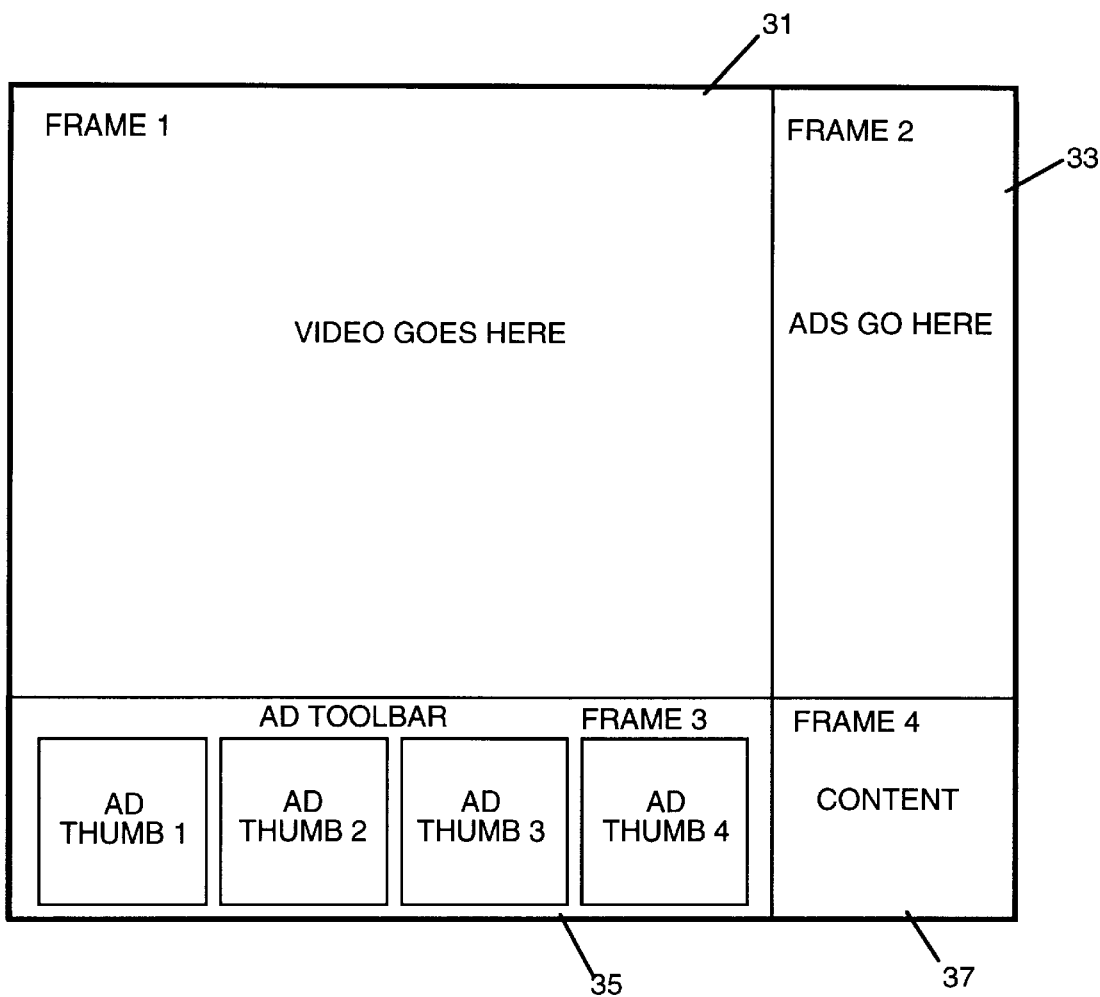
FIG. 2 shows the layout of frames within a web page used for displaying video content, banner ads and a set of selectable/clickable buttons or ad thumbnails according to the invention.

Using well-known techniques, an html (hyper text markup language) page is created that contains at least three different frames as shown in FIG. 2- one frame 31 contains the video clip to be displayed, a second frame 33 contains the ad that is synchronized to the video, and a third frame 35 contains the ad toolbar (step 19). Optionally, any other desired information content can be placed in a fourth frame 37. Once the master frameset has been created, specific individual pages that are to be displayed in those frames should also be created. All pages should be placed on the web server that the user will access. Specific techniques for completing these steps are well known in the industry and need not be specifically described.

V. Create ad Media and Enter Targeting Information Into the Advertising System

Ad media can be created using any number of well-known tools (step 21). For example, Adobe Photoshop can be used to create a file using the JPEG format.

Once the media has been created, the ad must be entered into an advertising system, such as Engage Accipiter or NetGravity AdServer.

To create an ad in Engage Accipiter:
Log into the AdManager
Select Campaigns from the left side menu.
From the Advertisements menu, select Create. This will call up the advertisement creation window.
In this window, select an advertiser, the type of ad, the size of the ad, and a description of the ad, then click the button marked Next.
On the next screen, enter the URL that points to the image, and the URL that the user should be taken to if they click on the ad, then click next.
On the next screen, review that the information entered was correct and click Submit.

To target the advertisement (step 23) in Engage Accipiter:
Log into the AdManager
Select Targets from the left side menu
From the Targets menu, select Create. This will call up the target creation window.
In this window, enter the name to be given the target and click the button marked Next.
Next, enter any specific targeting information desired, such as AREA LIKE HOME, and then click Submit. This information should match the information attached to the video file in step II, as well as any additional targeting information.

VI. Adding ad Thumbnails

When the video plays to the time specified for the timed ad launch, the ad frame is sent a request containing information allowing the ad system to determine what was playing in the video. This information, combined with the demographic information known about the user, is used to display an ad on the page. A thumbnail button representing the displayed ad is then, in effect, redrawn in another frame on the same page in an ad toolbar (step 23). Selecting a displayed thumbnail links to another page, typically the same page linked to the original ad represented by the thumbnail.

As the video continues to play, new ads will be displayed in the manner described above. When a new ad is to be displayed, a thumbnail representing the previous ad will appear in the ad toolbar. Each new ad will cause another thumbnail to be added to the toolbar. Of course, each thumbnail links to a page of additional information concerning the item represented by the thumbnail. Such additional information could include a form which, when completed, would enable the user to purchase the item represented by the thumbnail according to well known techniques.

To implement this mechanism, referring to FIG. 2, the video has the ability to tell frame 2 to load a specific page, with specific information passed to that page. The page that frame 2 loads contains commands to talk to an ad manager, which is a software module well known in the art, to get an ad. The ad manager generates the proper text for the ad and it is displayed in frame 2. The text of the ad contains instructions for updating frame 3. After frame 2 finishes loading, it sends instructions to frame 3 to place an additional ad on the ad toolbar.

Whatever thumbnails were already on the toolbar, if any, will be moved down one place. For example, if there are already two thumbnails on the toolbar, the thumbnail in ad thumb 1 will move to ad thumb 2, and the thumbnail for ad thumb 2 will move to ad thumb 3 until there is no more room on the toolbar. The number of thumbnails allowed can be more than fits on the toolbar by allowing the user to scroll frame 3. Of course, the ad toolbar may be oriented horizontally rather than vertically in which case, as new thumbnails are added, the older thumbnails are moved to the left or to the right. Further, rather than the oldest thumbnail being removed completely, once more thumbnails are presented than can be displayed in the space allocated for the ad toolbar, the ad toolbar can be set up to scroll so that the oldest thumbnails can retrieved at any time by scrolling the ad toolbar as necessary.

Although the forgoing describes a specific mechanism for implementing the invention, the invention may also be implemented by other equivalent mechanisms, which equivalents would be apparent to persons skilled in the field of the invention.

We claim:

1. A method for advertising products and services using a network adapted to be connected to a plurality of interactive devices, each interactive device including a display device and an input device, the method comprising:
    a) making video content available for display at a first location on the display device;
    b) making a first advertising message which is synchronized to the displayed video content available for display at a second location on the display device;
    c) making subsequent advertising messages which are synchronized to the displayed video content available for display at the second location, thereby replacing the first or prior subsequent advertising message with the subsequent advertising message at the second location; and
    d) as each subsequent advertising message is made available for display, making a thumbnail version of the replaced advertising message available for display in a toolbar.

2. The method defined by claim 1 wherein making a thumbnail version of the replaced advertising message available for display in a toolbar includes making a thumbnail version of the replaced advertising message available for display in a toolbar at a third location on the display device.

3. The method defined by claim 1 wherein making a first advertising message which is synchronized to the displayed video content includes synchronizing based on content an ad banner with the displayed video content such that the banner ad relates to the video content being displayed at the time the banner ad is displayed.

4. The method defined by claim 1 wherein at least one advertising message is targeted using demographic information from at least one of observation and volunteered by a user.

5. The method defined by claim 1 wherein at least one of the subsequent advertising messages is updated as more information becomes available about a user.

6. A method for advertising products and services using a network adapted to be connected to a plurality of interactive devices, each interactive device including a display device and an input device, the method comprising:
    a) making video content available for display at a first location on the display device,
    wherein making a first advertising message which is synchronized to the displayed video content includes
        i) editing the video content by creating a streaming interactive media for integration with a web site,
        ii) viewing the video content to the desired launch point of the ad,
        iii) inserting a marker on a timeline, and
        iv) entering a URL to be launched in a window when the video content is displayed when the marker on the timeline is reached;
    b) making a first advertising message which is synchronized to the displayed video content available for display at a second location on the display device; and
    c) making subsequent advertising messages which are synchronized to the displayed video content available for display at the second location, thereby replacing the first or prior subsequent advertising message with the subsequent advertising message at the second location.

7. The method defined by claim 2 wherein making a thumbnail version includes
    a) sending instructions to a frame containing the toolbar to place an additional ad on the ad toolbar, and
    b) moving each thumbnail already on the toolbar from its location to another location.

8. The method defined by claim 7, wherein the toolbar includes a number of thumbnails, the method further comprising:
    if the number of thumbnails are more than fits on the toolbar visible to a user, allowing the user to scroll the frame containing the toolbar.

9. The method defined by claim 1 further comprising:
    enabling a user to make a purchase of a product or service which is a subject of the advertising message.

10. The method defined by claim 6 further comprising:
    enabling a user to make a purchase of a product or service which is a subject of the advertising message.

11. The method defined by claim 6 further comprising:
    as each subsequent advertising message is made available for display, making a thumbnail version of the replaced advertising message available for display in a toolbar at a third location on the display device.

* * * * *